United States Patent [19]
Thyssen et al.

[11] Patent Number: 6,008,150
[45] Date of Patent: Dec. 28, 1999

[54] BINDER COMPOSITION FOR PRODUCING FIBROUS WEBS AND A PROCESS FOR PRODUCING FIBROUS WEB MOULDINGS

[75] Inventors: Stan Thyssen, Waalre, Netherlands; Walter Schmitt, Ludwigsau-Meckler; Dieter Hilmes, Spangenberg, both of Germany

[73] Assignees: Teodur N.V., Breda, Netherlands; Rieter Automotive Germany GmbH, Rossdorf, Germany

[21] Appl. No.: 08/836,644

[22] PCT Filed: Nov. 18, 1995

[86] PCT No.: PCT/EP95/04542

§ 371 Date: Aug. 18, 1997

§ 102(e) Date: Aug. 18, 1997

[87] PCT Pub. No.: WO96/16218

PCT Pub. Date: May 30, 1996

[30] Foreign Application Priority Data

Nov. 24, 1994 [DE] Germany .............................. 44 41 765

[51] Int. Cl.$^6$ .......................................................... B32B 5/16
[52] U.S. Cl. ........................... 442/417; 264/257; 28/100; 156/327; 156/330; 156/335
[58] Field of Search ........................... 264/257; 442/417; 28/100; 156/327, 330, 335

[56] References Cited

U.S. PATENT DOCUMENTS 4,886,701 12/1989 Ehnert .
5,096,996 3/1992 Hesse .

FOREIGN PATENT DOCUMENTS

| | | |
|---|---|---|
| 0 076 429 | 4/1983 | European Pat. Off. . |
| 0 258 684 | 3/1988 | European Pat. Off. . |
| 0 308 074 | 3/1989 | European Pat. Off. . |
| 0 363 539 | 4/1990 | European Pat. Off. . |
| 0 376 432 | 7/1990 | European Pat. Off. . |
| 0 528 456 | 2/1993 | European Pat. Off. . |
| 38 33 656 | 4/1990 | Germany . |
| 55-148266 | 11/1980 | Japan . |
| WO95/30034 | 11/1995 | WIPO . |

OTHER PUBLICATIONS

The Chemical Process Industries, Chpts. XXXV to XXXVI, pp. 739–773 (No Date).

The Chemistry and Manufacture of Powder Coating Resins, pp. 12–42 (No Date).

The Science of Powder Coatings, vol. 1, David A. Bate BSc (Hons); "The Raw Materials" pp. 25–67 (No Date).

*Primary Examiner*—Christopher Raimund
*Attorney, Agent, or Firm*—Pillsbury Madison & Sutro LLP

[57] ABSTRACT

A process and a binder for producing fibrous webs and fibrous web moldings, preferably in molding tools, in which fibrous webs are chemically bonded with powdered binders which consist wholly or partly of powder coating material, preferably recycled powder coating material.

19 Claims, No Drawings

BINDER COMPOSITION FOR PRODUCING FIBROUS WEBS AND A PROCESS FOR PRODUCING FIBROUS WEB MOULDINGS

FIELD OF THE INVENTION

This invention relates to a special binder mixture for producing fibrous webs, and to the use of this binder mixture. Processes for producing fibrous webs and fibrous web mouldings which are chemically bonded with binders are also described.

BACKGROUND OF THE INVENTION

Mouldings based on fibrous webs are widely used in industry. These comprise felts made of fibres of various types which may be mixed with binders. Preliminary products, which are termed prepregs (chemically bonded fibrous webs) can be produced from these fibrous webs, and are then moulded, cured and optionally cut to size using corresponding processing tools. It is also possible to produce corresponding continuous products made of fibrous web directly from the fibres and binder powders. These mouldings or flat goods have a wide range of uses. In the automobile industry, for example, these products are used as mouldings, e.g. as an insulating material for engine compartments or wheel guards, or as boot compartment insulation. Another area of use is their use as flat goods, e.g. as an insulating material in washing machines, linen dryers or loudspeakers, in sound-absorbing walls. They can be provided with additional coatings, e.g. by flock coating, covering or laminating. These mouldings or flat parts which are thus provided with a visually stable and decorative surface coating can then be used, for example, as door trims, hat racks or roof linings in the automobile industry.

A fibrous web material is understood to be a bonded textile material which is produced by the consolidation of fibrous web, particularly spun-bonded web (e.g. parallel, crossed or matted fibrous web), by a wet or dry route. In the course of this procedure, consolidation is effected mechanically (e.g. needled felt) or in the manner of paper manufacture with the aid of cellulose fibres, or chemically by adhesive bonding, bonding or dissolution. The present invention relates to the last-mentioned case, in which a binder is added for the chemical consolidation of the fibrous web.

Methods of producing fibrous webs and mixing these webs with binder powders are known. In the course of these methods, the fibrous material is homogenised, e.g. in a fibre mixing chamber, and is deposited on a conveyor belt as a loose fibrous layer.

The binder mixture is then applied to the fibrous material, e.g. by metering rolls or vibrating troughs, and is homogeneously mixed. The homogeneous mixture of fibres and binder powder is deposited to form a continuous fibrous web. The components of this mixture may either be adhesively bonded to each other by slight heating and subsequent cooling, whereupon prepregs are formed, or flat or rolled goods may be produced which are already fully cured. The prepregs are not yet finally cured, but are stable on storage. After processing into their final form, these prepregs are thermally crosslinked under the action of heat at temperatures up to 210° C., whereupon three-dimensional thermosetting plastics mouldings are obtained.

Thermosetting plastics, and particularly phenolic resins here, are nowadays used as binders in many cases. Fibrous webs and fibrous web mouldings are used in many areas of daily life, and are also used in the automobile industry in particular. Difficulties can arise in use, since phenolic resins contain the chemical compound hexamethylene tetramine, abbreviated to hexa, as a curing component, which can result in an odour nuisance if insufficient reaction takes place.

SUMMARY OF THE INVENTION

The object of the present invention is to provide a binder mixture and a process for producing fibrous web mouldings in which the pure resins which are normally used can be replaced by other components which result in stable, reactive binder mixtures which are suitable for the production of fibrous web prepregs or cured fibrous web goods. A further object is to reduce the content of substances harmful to health. These binder mixtures must fulfil the usual requirements for the production of fibrous web mouldings and must thereby give rise to cured, stable mouldings which can be adapted to various purposes of application.

Another object is the development of a process for producing fibrous web mouldings with these altered binder mixtures.

It has been shown that this object can be achieved by the use of powder coating waste materials as or in powdered binders for the production of mouldings from fibrous webs. In particular, it has surprisingly been found that a considerable part at least of the resins which are normally used can be replaced by powder coating waste materials.

The present invention relates to a mixture for producing mouldings from fibrous webs, containing a) 20 to 45% by weight of a powdered binder mixture,
b) 80 to 55% by weight of organic and/or inorganic fibres, which is characterised in that the powdered binder mixture contains $a_1$) 0 to less than 30% by weight of phenolic resin, preferably powdered phenolic resin, and
$a_2$) 100 to 70% by weight of powder coating waste materials.

The present invention also relates to the use of powder coating waste materials for producing mouldings which contain fibrous web.

The invention further relates to processes for producing mouldings from fibrous webs and these binder mixtures.

In the lacquer industry, powder coatings are being increasingly used. These have the advantage that a solvent-free application procedure is possible. Environmental emissions can thereby be considerably reduced. However, application procedures for powder coatings have the disadvantage that a considerable proportion of the powder does not reach the object to be coated. These powders are collected in the spray-coating booth as what is termed overspray. The powders are sensitive as regards their particle size distribution and purity.

This overspray therefore has to be disposed of as waste material. In the last stage of powder coating production, the comminuted, extruded powder coating materials are ground. Fine dust is produced during this grinding operation, which has an adverse effect on the coating procedure. This dust is therefore substantially removed. The dust can only be reprocessed with difficulty and has to be disposed of as hazardous waste.

The fibres which can be used for the various fibrous webs comprise woven, felted or blended fibres. The fibres consist of known materials, e.g. of natural, organic and inorganic fibres. Examples thereof include glass fibres, rock wool fibres, polyester fibres, acrylic resin fibres, polyolefine fibres, wool fibres, cotton fibres, flax fibres or the like. Textile fibres, particularly cotton fibres, e.g. fibrous waste materials from the textile industry, are preferably used. These fibres or fibrous webs made from them are known in industry. The processes by which they can be produced are likewise known. Production may be effected by weaving or felting, for example. The resulting fibrous webs should be substantially dry; they may optionally be impregnated with additives.

Examples of the phenolic resins which can be used in the mixtures according to the invention include the usual reactive phenolic resins which have long been known in industry. These may be reactive, powdered phenolic resins containing uncrosslinked OH groups, for example. Resins of this type are already used for the production of mouldings from fibrous webs. By way of example, phenolic resins can be used which are based on phenol and formaldehyde, such as those which are known as resols or novolacs for example. These resins may contain condensation products of formaldehyde as possible crosslinking agents.

These resins have already been widely described in the literature, e.g. by R. N. Shreeve, in "The Chemical Process Industries", Plastics chapter, 1945, and are commercially available. Further phenolic resins are also described in DE-A-38 33 656, EP-A-0 363 539 and in EP-A-0 376 432. Phenolic resins of the novolac type are particularly preferred.

The reactivity of phenolic resins is determined by the type and amount of crosslinking agent used. A crosslinking reaction generally sets in between 120° C. and 222° C.

The resins generally exist in the form of powders. Suitable particle sizes are between 0.1 and 500 $\mu$m for example, preferably between 2 and 150 $\mu$m, most preferably between 10 and 60 $\mu$m.

The particle sizes of the powder coating waste materials used fall within the same range as those of the resins, for example, and are preferably between 1 and 300 $\mu$m, most preferably between 10 and 60 $\mu$m. If powder coating waste materials are used, the particle sizes of which are too small for the desired purpose of application, it is possible to obtain larger particle sizes by agglomerating the particles.

The powder coating waste materials which can be used according to the invention are those obtained from customary known powder coatings. The binders of these powder coatings may be based on epoxy resins, polyester resins, polyurethane resins or acrylate resins, for example. These powder coating waste materials arise, for example, as overspray from spray-coating booths or as faulty batches during the production of powder coatings. It is also possible to collect and use filter dusts, and residues from the comminution of the powders.

The powder coating waste materials which can be used in the mixture according to the invention are not yet crosslinked. They contain reactive groups, such as carboxyl groups, epoxide groups, hydroxyl groups, amino groups, amide groups or isocyanate derivatives for example. These are capable of reacting with each other on heating. The crosslinking temperature depends on their basic skeletal structure. It is usually between 120 and 220° C. Powder coating materials with crosslinking temperatures above 180° C. are preferably used only in small amounts, in order that the crosslinking of the binder mixture used is as complete as possible, even at curing temperatures for the mouldings of about 160° C. Furthermore, at high crosslinking temperatures, particularly when using fibrous web comprising plastics fibres, there is a risk of the fibres being degraded, which results in a reduction in the stability of the moulding. The powder coating crosslinking temperatures are preferably less than 160° C.

The powder coatings used are known binder vehicle systems. They comprise customary resins, for example those with an epoxide, polyester, polyurethane or acrylate basis.

Epoxide powder coatings contain epoxy resins as their main binder component. These are frequently crosslinked using curing agents which contain hydroxyl groups, or amide or amine groups in particular.

In addition, polyester powder coatings are known in which the main binder component comprises polyesters containing carboxyl groups. Crosslinking agents which contain epoxide groups, or crosslinking agents which contain amino or amide groups, are known as crosslinking agents which are present in proportions, for example. In this respect, it is customary for the crosslinking agents used in each case to be of higher functionality than the main binder component. If epoxide/polyester mixtures are used, which are termed hybrid systems, approximately equal quantitative ratios of polyesters and epoxy resins, respectively, are present.

Polyurethane powder coatings are based on polyesters which contain hydroxyl groups, which are capable of crosslinking via reversibly blocked polyisocyanates which are protected with known capping agents such as caprolactams or ketoxime for example, or which exist as uretdione.

Powder coatings of the acrylate type are generally mixtures of two or more acrylate resins which each contain functional groups such as epoxide groups, carboxyl groups, hydroxyl groups or isocyanate groups. The groups which react with each other are distributed between different molecules here.

These binder vehicle powders are described, for example, by S. T. Harris, in "The Technology of Powder Coatings", 1976, and by D. A. Bate, in "The Science of Powder Coatings", Vol I, 1990.

Colourless or pigmented powder coating materials may be used, wherein it is possible to employ the customary known inorganic or organic colouring pigments as pigments. It is also possible to incorporate effect pigments, e.g. metallic pigments, in the powders. Separation according to colour is not necessary. The fineness of grain of the powder is not important; it should simply be ensured in general that an average sample of the different powder residues is used for the production of the binder mixture. This results in improved behaviour on mixing and improves the constancy of production of the binder mixture.

DETAILED DESCRIPTION OF THE PREFERRED EMBODIMENTS

Any individual powder coating materials can be used in the binder mixtures. If only small proportions of phenolic resins are admixed with the mixtures (less than 5%), powder coating materials are preferably used which comprise a higher density of crosslinking. The use of epoxide powders, polyester powders or mixtures thereof as $a_2$) is preferred. In this respect, up to 60% by weight of $a_2$), preferably up to 30% by weight, may optionally be replaced by polyurethane powder and/or polyacrylate powder. One particularly preferred embodiment makes use of a mixture of epoxide powders and polyester powders as $a_2$). In this connection, it is possible to produce a mixture directly, within the desired weight ratios, and to store it, or it is possible to produce this from the individual components by mixing them directly before further processing. The individual chemical types of materials are homogeneously mixed so that a sample which is taken is thoroughly mixed as regards particle size distribution, composition and pigmentation. The density of crosslinking or the reactivity of the binder mixture can optionally be influenced via the addition of further, additional crosslinking constituents.

One preferred embodiment employs a mixture of powder coating resins without additional phenolic resins. In this respect, the powder coating waste materials or powder coating materials can be mixed. A favourable particle size distribution can optionally be achieved by additional comminution or by the agglomeration of very fine powder coating constituents. The particle size may preferably be of the order of magnitude quoted for phenolic resins.

Customary additives or adjuvant substances may optionally be added together with the powders. Examples thereof may include catalysts, accelerators or flame retardants. Tin compounds such as dibutyltin dilaurate, carboxylic acid salts such as lithium benzoate, quaternary ammonium compounds such as tetrabutylammonium bromide, cetyltrimethylammonium bromide, benzyltrimethylammonium bromide, or tetramethylammonium chloride, or tertiary amines such as triisopropylamine or methylimidazole, are preferably used as catalysts. Examples of suitable accelerators and crosslinking agents include basic compounds which contain epoxide groups, such as triglycidyl isocyanurates, glycolurils, dicyanodiamide or beta-hydroxylamide. These additives may be added separately as powdered substances. They may also be introduced mixed with binder constituents as a master batch, or may be added as a mixture with binder powder $a_1$).

Flame retardant substances may also be introduced. These comprise the usual known substances which are contained in flame retardant coatings. Examples of compounds such as these include borates such as sodium borate, phosphates such as ammonium phosphate or sodium phosphate, or aluminium hydroxides or oxides. Examples of other suitable compounds include compounds containing heavy metals such as tin oxide compounds, or perbrominated or perchlorinated compounds such as tetrabromophenol. Flame retardant substances which are free from heavy metals and halogens should preferably be used, however. These flame retardant substances exists as powders. They may be introduced via a separate master batch or may be added via binder powders $a_1$) or $a_2$), as a homogeneous mixture with the powder component in each case.

Pigments may also be introduced into binder mixture a). It is generally preferable not to introduce additional pigments, however, but to us only the fibrous fillers of the fibrous web or the pigments contained in powder coating materials $a_2$).

The prepreg formed before curing, or the finished moulding, generally contains 55 to 80% by weight of fibres and 20 to 45% by weight of the binder mixture.

In one preferred embodiment, the binder mixture consists of 0 to 10% by weight of phenolic resins and 100 to 90% by weight of powder coating binders. The additives and adjuvant substances described above may be contained in an amount of up to 20% by weight, preferably up to 15% by weight, wherein the sum of all the components is 100%. Any powder coating waste materials may be used. It is possible to use only one type of powder coating material or to use a mixture comprising a plurality thereof; a mixture of polyester and epoxy resins is preferred, however. Moreover, the weight ratio of polyester powder to epoxide powder is preferably 0.2:1 to 7:1, most preferably 0.8:1 to 3:1. When selecting the powder coating waste materials, it should be ensured that they contain a sufficient number of reactive groups.

Compared to phenolic resins, normal powder coating materials frequently exhibit low rates of crosslinking due to their original purpose of application, whereby good flow and wetting properties are obtained during coating. Within the scope of the present invention, it has been shown that it is advantageous when using powder coating materials to adapt the corresponding installations and processes for the production of chemically bonded fibrous webs and fibrous web mouldings to these new binders.

Therefore, the present invention also relates to processes for producing mouldings from fibrous webs and binder mixtures. These processes can be adapted to the properties of the binder powders.

The process can be carried out using customary apparatuses which are suitable for the production of fibrous webs and fibrous web mouldings, e.g. moulding tools. In this respect, it can be advantageous according to the invention if the apparatuses and the process control, respectively, are adapted correspondingly.

One problem which may arise, for example, is that the powder coating materials, and particularly recycled powder coating materials, may have flow properties which are different from those of phenolic resins and phenolic resin mixtures. It is therefore advantageous to increase the output of a material feeder station and to equip it so that its output can be regulated. In addition, the fluting structure of a metering roll used for feeding material can be altered so that it can cover a larger free-flowing range.

Another problem which may arise, for example, is that of admixing the powder coating material or recycled powder coating material as uniformly as possible with the fibrous web. According to the invention, therefore, the addition of binder may preferably be effected via a proportioning belt weigher.

It is also advisable to subject the web which is provided with binder to a treatment in a heating duct, for example, so as to adapt the temperature-time relationship. In particular, the melting point and reaction rate of a powder coating material may differ from those of phenolic resins.

It is frequently ascertained that a fibrous web bonded with powder coating material exhibits a considerably greater tendency to stick both to conveyor belts and in the moulding press. In accordance with one embodiment according to the invention, in order to reduce this tendency to stick or to shorten the period in which there is an increased tendency to stick, the bonded fibrous web or a moulding removed from the moulding tool can be dried. An increased drier suction is therefore employed on conveyor belts.

It can also be advisable to provide a cutting installation for cutting the bonded fibrous web to length. Since the brittleness/hardness of the fibrous web is lower as a result of the powder coating binder, it is advisable if the drive of the cutting knife is no longer provided by a passive drive but by a separate drive, in order to generate friction.

Problems may also arise when moulding fibrous web in a moulding tool. It is therefore advisable to speed up the rate of reaction and to reduce the tendency of the fibrous web to stick. According to the invention, this can be effected using superheated steam, which accelerates the curing of the binder due to its higher heat capacity. Superheated steam also reduces the adhesion of the powder coating material, which in its hot state is still sticky, to the hot moulding tools.

On account of the decreased thermosetting properties of the powder coating binder compared with those of phenolic resins, it is advisable to lay the still-plastic mouldings on a shaped supporting laminate after they are removed from the moulding tool.

The binder mixture a), the prepregs, and the cured mouldings also, contain a reduced proportion of free phenols or formaldehyde. The dangers due to these substances, which are harmful to health, are thereby reduced.

These mouldings can also be coated or can be employed as supports for other components. This can be effected, for example, by applying a film to the surface of the moulding simultaneously with the crosslinking and shaping of the mouldings. It is also possible to obtain a special coating of the surface by the subsequent covering and laminating of films. Methods of laminating mouldings are widely used in industry. They can be carried out according to the prior art.

It is also possible to impart a flock coating to the surface of the mouldings. In the course of this procedure, short fibres are applied substantially vertically to the surface by means of adhesives, and then result in a dense, soft surface. Flock coating methods are likewise known. The mouldings produced from the materials according to the invention may optionally be coated. In this respect, all the known coating media which are known in industry may be used. Smooth, glossy coatings are produced after heating.

The mouldings which are coated in this manner exhibit a pronounced decorative effect. Depending on the process selected, smooth, soft, grained or chemical-resistant coated surfaces can be produced. Mouldings which are fire-resistant can also be obtained by the additional use of flame retardant additives.

The properties of the powder coating material during the production of fibrous web and fibrous web mouldings are satisfactorily taken into consideration by the procedure according to the invention, due to which the technical properties of the fibrous web and fibrous web mouldings produced are fully equivalent to those of products which are produced from thermosetting plastics. One significant advantage, however, is that even if the reaction of the powder coating materials is insufficient, no odour nuisance is produced. At the same time, a significant contribution is made to the protection of the environment, since recycled powder coating material is re-used in the present process.

The fibrous webs and mouldings can be used for customary purposes of application in the usual fields, e.g. in the automobile industry.

EXAMPLE 1

A mixture comprising 9 g of a commercially available powdered phenolic resin (novolac containing hexamethylenetetramine), which had an average particle size of 35 μm and a crosslinking temperature of 150° C., and 40 g of a pigmented powder coating material based on commercially available epoxy resin powder, as well as 50 g of a pigmented powder coating material based on polyester resins, wherein the powder coating materials each had a pigment content of 10%, was homogenised in a commercially available mixer unit.

(polyester:epoxide=1.25:1; 10% phenolic resin content)

The mixture could be stored for a extended period without further loss of reactivity.

EXAMPLE 2

A mixture was prepared comprising an epoxy resin powder pigmented with 10% barium sulphate and 30.1 g of a non-pigmented polyester powder coating material, and 0.4 g tetrabutylammonium bromide was added, and the total mixture was thoroughly homogenised.

Filter dusts from the production of powder coating materials were used as polyester powders or epoxide powders. These were homogenised, and an average sample of these constituents was then used in the examples.

Prepregs were produced from the powders of Examples 1 or 2 with a fibrous web which was produced in the known manner and which contained more than 80% of cotton fibres. For this purpose, the fibrous webs were homogeneously mixed, by mechanical movement, with the binder powder supplied via a proportioning belt weigher and were passed through a heated duct (about 2–3 minutes; 80° C.–100° C.). This resulted in prepregs which were stable on storage and in which the resin and fibres had bonded to each other. The prepreg was dried during cooling, by air flowing over it.

Mouldings were produced from these prepregs. The prepregs were cut to size using a driven cutting knife, moulded into their intended shape in a press, and cured there for 100 to 110 seconds at temperatures between 140° C. and 160° C. In the course of this procedure, the temperature was preferably attained by heating with superheated steam. After curing, thermosetting plastics products were obtained which were dimensionally stable on heating.

The density can be influenced via the amount of prepreg or via the pressure which is set. The crosslinked mouldings which were produced were removed from the press mould, optionally dried in an air current and laid on a supporting laminate.

The mouldings obtained in this manner were dimensionally stable after cooling, and had no content, or only a low content, of free phenol or formaldehyde.

We claim:

1. A process for producing fibrous webs and fibrous web mouldings, in which fibrous webs are chemically bonded with binders, comprising:
   reacting a mixture comprising the following components together:
      a) 20 to 45% by weight of a powered binder mixture; and
      b) 80 to 55% by weight of fibers;
      wherein the powered binder mixture comprises:
         $a_1$) 0 to less than 30% by weight of phenolic resin; and
         $a_2$) 100 to more than 70% by weight of not yet crosslinked powder coating waste materials comprising at least one member selected from the group consisting of epoxide, polyester, polyurethane and acrylate resins containing reactive groups.

2. A process according to claim 1, further comprising: adding the binder by means of a material feeder station which is adjusted for the binder.

3. A process according to claim 1, further comprising: adding the binder by means of one or more metering rolls, wherein structure of a fluting of the one or more metering rolls is altered in order to achieve a larger free-flowing range for the binder.

4. A process according to claim 1, further comprising: adding the binder via a proportioning belt weigher.

5. A process according to claim 1, further comprising: during moulding of the fibrous webs to produce mouldings in hot moulding tools, speeding up the reaction by use of superheated steam to achieve more rapid curing of the binder.

6. A process according to claim 5, further comprising: introducing the superheated steam into a moulding tool at a pressure of 1 to 15 bar.

7. A process according to claim 5, wherein a moulding tool is acted upon by the superheated steam before introducing the binder mixture and fibers to the tool.

8. A process according to claim 5, wherein, after removal from a moulding tool, the mouldings are placed on a shaped supporting laminate for cooling.

9. A process according to claim 5, further comprising:
drying the bonded fibrous webs or mouldings.

10. A process according to claim 1, further comprising:
crosslinking the fibers and binder mixture.

11. The process of claim 1, wherein the power coating waste materials have particle sizes between 10 and 60 µm.

12. A binder mixture made according to the process of claim 1, for producing fibrous webs and mouldings made of fibrous webs comprising, as pre-reaction components:

0 to less than 30% by weight of phenolic resin, and 100 to 70% by weight of not yet cross-linked powder coating waste materials comprising at least one member selected from the group consisting of epoxide, polyester, polyurethane and acrylate resins containing reactive groups.

13. A binder mixture according to claim 12, comprising: epoxide resins and polyester resins in a mixture ratio of 1:0.2 to 1:7, as the powder coating waste materials.

14. A process for using the binder mixture according to claim 12, comprising:

moulding fibrous webs containing the binder mixture in a moulding tool.

15. The process of claim 12, wherein the power coating waste materials have particle sizes between 10 and 60 µm.

16. A process for using powder coating waste materials comprising:

adding said powder coating waste materials as a binder or in binders for producing chemically bonded fibrous webs and fibrous web mouldings; wherein the powder coating waste materials have particle sizes between 10 and 60 µm and comprise reactive not yet cross-linked groups; and cross-linking the powder coating waste materials.

17. A process according to claim 16, wherein the powder coating waste material comprises not yet cross-linked reactive powder coating materials based on at least one member selected from the group consisting of epoxide, polyester, polyurethane and acrylate resins.

18. A process according to claim 16, comprising:

using epoxide resins and polyester resins in a mixture ratio of 1:0.2 to 1:7, as the powder coating waste materials.

19. A process according to claim 16, comprising:

adding flame retardants.

* * * * *